United States Patent [19]

Rosenfeld et al.

[11] 3,749,109
[45] July 31, 1973

[54] SELF-CONTAINED RELAY MODULE UNIT AND SYSTEM UTILIZING THE SAME

[75] Inventors: Jacob R. Rosenfeld, Roslyn; Philip G. Van Osten, King of Prussia, both of Pa.

[73] Assignee: Robertshaw Controls Company, Richmond, Va.

[22] Filed: Oct. 22, 1971

[21] Appl. No.: 191,633

[52] U.S. Cl. .................................... 137/85, 137/84
[51] Int. Cl. .......................................... G05d 16/00
[58] Field of Search .................... 137/84, 85, 86, 82

[56] References Cited
UNITED STATES PATENTS

| | | | |
|---|---|---|---|
| 2,842,148 | 7/1958 | Jones | 137/85 |
| 2,927,593 | 3/1960 | Hall | 137/85 |
| 3,428,069 | 2/1969 | Underg | 137/85 |
| 3,413,997 | 12/1968 | Taylor | 137/85 |

*Primary Examiner*—Alan Cohan
*Attorney*—Auzville Jackson, Jr. and James T. Candor

[57] ABSTRACT

A self-contained relay module unit for ready attachment to and detachment from a device having a pivotally mounted lever that pivots in response to changes in the operation of the device, the self-contained unit having a housing provided with a pilot nozzle that senses pivotal movement of the lever. The housing has a force balancing member that is adapted to engage the lever and pivot the same in a direction opposite to the pivot thereof by the changes in the operation of the device so as to place the lever in a balanced condition thereof. The housing has a relay valve means for causing such movement of the force balancing member in relation to the lever condition being sensed by the pilot nozzle.

13 Claims, 1 Drawing Figure

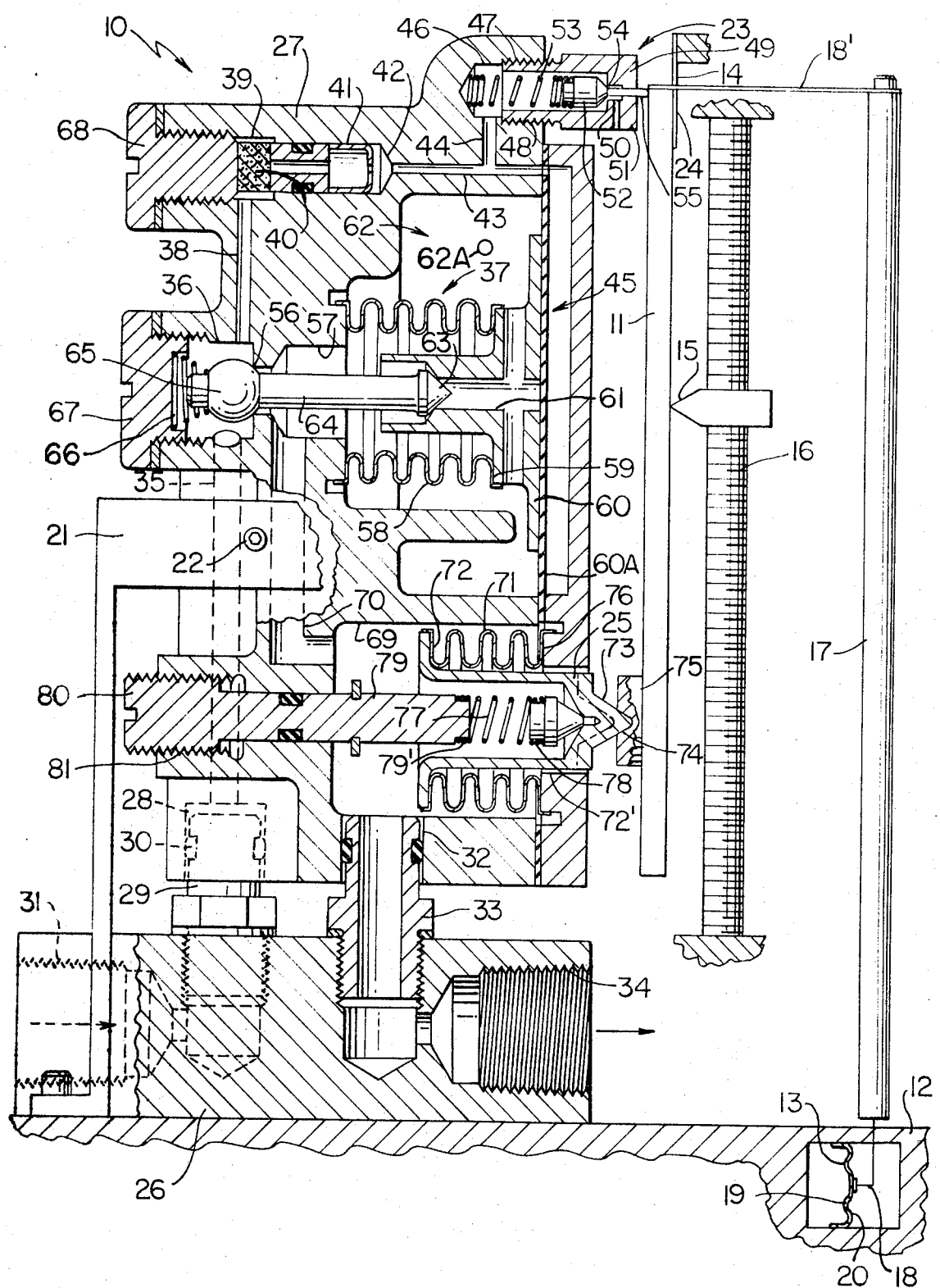

SELF-CONTAINED RELAY MODULE UNIT AND SYSTEM UTILIZING THE SAME

BACKGROUND OF THE INVENTION

Structure has been provided in the past for rebalancing a secondary lever of a secondary assembly that is moved in response to the changes in the operating conditions of a primary device, such as pressure changes in a pressure differential cell or a differential pressure transmitter, wherein the secondary lever is pivoted in proportion to the pressure differential of the cell or other operating device. Such rebalancing structure senses the pivotal movement of the secondary lever and through a relay valve structure causes a rebalance bellows or member to act on the secondary lever to pivot the same back to its balanced condition as well as supply a pressure signal indicating the force required to rebalance the secondary lever for recording purposes or the like whereby such secondary assembly is adapted to indicate at all times the pressure differential occurring at the primary pressure differential cell or other operating device.

However, it has been found according to the teachings of this invention, that when such secondary assembly becomes defective in the field, a highly skilled technician must be utilized to individually test and replace the various parts of the secondary assembly such as the pilot nozzle, the relay valve structure, and/or the force balancing structure in order to correct the failure thereof. In order to accomplish such repair in the field, a relatively long "down time+ of the primary device is required because of the complicated and time consuming assembly and disassembly of the secondary assembly during the repair thereof. Alternately, such "down time" was eliminated only be replacing the entire primary device as well as the secondary assembly during such repair.

SUMMARY

This invention provides a self-contained relay module unit that is adapted to be simply and readily attached to and deteched from the primary device in a non-time consuming manner while being adapted to accurately act on the secondary lever and rebalance the same for the reasons previously set forth.

In this manner, the relay valve structure, the pilot nozzle structure, the rebalance bellows or member, the zero adjusting mechanism and the connections to the supply pressure and to the output line are all assembled in a single self-contained unit of this invention whereby such modular unit can be tested independently of the other parts of the differential pressure transmitter to thereby eliminate outside variables and isolate any problems that might subsequently occur in the assembly. The self-contained module unit of this invnetion is then easily assembled to the secondary assembly lever arrangement of an existing primary device which allows for rapid removal and replacement in the field with a minimum of downtime of such primary device.

Because of the self-contained nature of the module unit of this invention, trouble shooting in the field is vastly simplified. In fact, in order to eliminate down time in the field in the past, prior known manufacturers replaced the entire secondary assembly or the entire primary differential pressure transmitter and its secondary assembly before repairing the replaced arrangement. The self-contained module unit of this invention also eliminates the need for external pipe connections between the pilot nozzle, the rebalancing bellows and the relay valve structure whereby this invention eliminates poor solder joints, and critical bending of the external tubing as required in certain prior known devices.

Thus, it can be seen that the above advantages of this invention are provided by a self-contained relay module unit for ready attachment to and detachment from a primary device having a pivotally mounted lever that pivots in response to changes in the operation of the device. The embodiment of the self-contained unit of this invention has a housing provided with a pilot nozzle that senses pivotal movement of the lever. The housing is also provided with a force balancing member or bellows that is adapted to engage the lever and pivot the same in a direction opposite to the pivot direction thereof caused by the changes in the operation of the primary device so as to place the lever back into a balanced condition thereof. The housing also has a relay valve means for causing such movement of the force balancing bellows or member in relation to the lever condition being sensed by the pilot nozzle. Such relay module unit can be readily attached to the primary device by simple fastening means, and can be readily removed therefrom by unfastening such fastening means so that a replacement module unit can be substituted therefor in a non-time consuming manner.

Accordingly, it is an object of this invention to provide a self-contained relay module unit having one or more of the novel features set forth above or hereinafter shown or described.

Another object of this invention is to provide an improved system utilizing such a self-contained relay module unit.

Other objects, uses and advantages of this invention are apparent from a reading of this description which proceeds with reference to the accompanying drawing forming a part thereof and wherein:

DESCRIPTION OF THE DRAWING

The accompanying drawing illustrates an embodiment of the relay module unit of this invention mainly in cross-section and acting on the secondary lever of a primary pressure differential device illustrated schematically.

DESCRIPTION OF ILLUSTRATED EMBODIMENT

Referring now to the drawing, the self-contained relay module unit of this invention is generally indicated by the reference numeral 10 and is illustrated as controlling the secondary lever 11 of a primary device 12 which during the operation thereof has a pressure differential created across a diaphragm 13 thereof and which is adapted to be measured by the secondary lever 11 in a conventional manner by pivotal movement of the lever and then be rebalanced by the relay module unit 10 of this invention in a manner hereinafter described to repivot the lever 11 back to its balanced condition.

As is well known, the secondary lever 11 of the primary device 12 is vertically suspended by a vertical flexure leaf spring 14 and is adapted to pivot against an adjustable fulcrum member 15 carried on a rotatably mounted threaded rod 16 which is rotated to set the position of the fulcrum 15 relative to the secondary lever 11 so as to correlate the range of the pressure differential of the primary device 12 to the range of the relay module unit 10 in a manner conventional in the art. The primary device 12 has a primary lever 17 interconnected at one end thereof by suitable mechanism 18 to the pressure differential diaphragm 13 and interconnected by a tieing means 18' to the secondary lever 11 at the other end thereof so that movement of the diaphragm 13 upon changes in the pressure differential across the high and low sides 19 and 20 thereof will cause pivotal movement of the secondary lever 11 about the fulcrum 15 with such pivotal movement of the secondary lever 11 being subsequently rebalanced by the relay module unit 10 in a manner hereinafter described.

The primary device 12 carries suitable bracket means 21 that is utilized to secure the relay module unit 10 in a fixed position by having a plurality of threaded fastening members 22 pass through suitable openings in bracket 21 and be received in threaded openings in the relay module unit 10 to support the unit 10 in the manner illustrated in the drawings whereby a pilot nozzle 23 of the unit 10 is adapted to sense the pivotal movement of the upper end 24 of the secondary lever 11 caused by pressure change across the diaphragm 13 and a force balancing member 25 of the unit 10 is adapted to rebalance the pivotal movement of the lever 11 to a balanced condition thereof in a manner hereinafter described so as to provide an output signal that is proportional to the pressure differential across the diaphragm and can be utilized for recording purposes, indicating purposes or other desired purposes as the case may be.

The bracket 21 and threaded fastening members 22 support the unit 10 in such a manner that the unit 10 is supported in a floating manner above a supply pressure input and signal output housing 26 that forms a part of the primary device 12, but is fluidly interconnected to the unit 10 in a manner hereinafter described.

As illustrated in the drawings, the unit 10 comprises a housing means 27 constructed from a plurality of parts as illustrated and is provided with internal passages and chambers so as to eliminate the need for any external piping as in prior known devices.

In particular, the housing 10 has a supply pressure inlet port 28 adapted to receive a supply pressure nipple 29 of the stationary housing 26 and be sealed thereto by an annular O-ring 30 so that supply pressure is adapted to enter the housing 27 of the unit 10 from a supply port 31 of the primary housing 26 that leads into the supply pressure port 28 as illustrated and, similarly, the output signal pressure of the unit 10 is adapted to pass out of an outlet port 32 of the housing 27 into the passage of an outlet pressure nipple 33 of the housing 26 that is also fluidly and sealingly received in the outlet port 32 and from the housing 26 out through the outlet 34 thereof to a recording and/or indicating apparatus or other desired structure as will be apparent hereinafter.

The supply pressure inlet port 28 of the housing 27 is interconnected by a passage 35 to a chamber 36 of a relay valve means 37 of the unit 10 constructed in a manner hereinafter described, the chamber 36 in turn leading by a passage 38 to a filter chamber 39 that has a suitable filter 40 disposed therein so that fluid entering the filter chamber 39 must pass through the filter 40 and then through the orifice of an orifice cup 41 disposed to the right of the filter chamber 39 so that the restricted fluid flow from the supply port 28 will continuously enter a chamber 42 of the unit 10 that feeds the restricted fluid flow by a passage 43 to a branch passage 44 of the pilot nozzle 23 as well as to a loading chamber 45 of the relay valve means 37 for a purpose hereinafter described.

The pilot nozzle 23 includes a chamber 46 fluidly connected to the branch passage 44 and is internally threaded at 47 to threadedly receive an externally threaded part 48 of an adjustable member or cup 49 that projects out of the housing 27 as illustrated and has a passage 50 passing through the closed end 51 thereof so as to be disposed in fluid communication with the chamber 46 that receives the restricted fluid from the supply port 28.

A valve member 52 is disposed in the cup 49 of the pilot nozzle 23 and is urged by a compression spring 53 in a direction to seat against a valve seat 54 of the cup 49 to tend to close the interconnection of the chamber 46 to the atmosphere through the bleed passage 50 in the end wall 51 of the cup 49. However, the valve member 52 has a plunger 55 thereof projecting out through the passage 50 of the cup 49 to engage against the upper end 24 of the secondary lever 11 so that the pivotal position of the upper end of the lever 11 causes the valve member 52 to follow the pivotal movement thereof and, thus, causes a change in the amount of bleed of the pressure fluid in the chamber 46 to the atmosphere as will be apparent hereinafter.

The chamber 36 in the housing 27 is interconnected by a valve seat 56 to another chamber 57 of the housing 27 that is fluidly interconnected to the interior of a relay bellows 58 of the relay valve means 37, the bellows 58 having its other end 59 closed by a bellows cap 60 that is carried by a flexible diaphragm 60A that separates the load chamber 45 from a chamber 62 which vents to atmosphere via vent 62A. The chamber 62 is outboard of and surrounds the relay bellows 58. The bellows cap 60 has a passage 61 therein that leads to the chamber 62. The passage 61 is normally closed by a valve end 63 of an axially movable stem 64 which carries a valve member 65 at the other end thereof that is utilized to open and close the valve seat 56. A compression spring 66 normally urges the valve stem 64 in a direction to close the valve member 65 against the valve seat 56 as illustrated. The compression spring 66 and valve stem 64 are accessible for replacement or repair by means of a removable threaded closure 67 of the housing 27 in the same manner that the orifice cup 41 and filter 40 are accessible by a removable threaded cover or closure 68 of the housing 27.

The chamber 57 of the housing 27 is also interconnected to another chamber 69 of the housing 27 by a branch passage 70 with the chamber 69 having a rebalancing bellows 71 therein, the rebalancing bellows 71 having one end 72 closed by the rebalance member 25 that is so constructed and arranged that the same passes through the bellows 71 and projects out through an opening 72' in the side of the housing 27 to have a conical end 73 thereof received in a conical socket 74 of a socket member 75 carried by the secondary lever 11 as illustrated in the drawings. The other end 76 of the rebalance bellows 71 is closed by and fixed to the housing 27 so that the bellows 71 is responsive to the pressure of the fluid in the chamber 69 and as the pressure in the chamber 69 acting on the end 72 thereof increases, the bellows 71 collapses and has the end 72 thereof moved to the right and, thus, carries the rebalancing member 25 to the right to cause counterclockwise pivoting movement of the secondary lever 11 for a purpose hereinafter described. Conversely, a decrease in pressure in the chamber 69 causes the bellows 71 to expand and move the member 25 to the left so that lever 11 can pivot in a clockwise direction.

The chamber 69 is also in fluid communication with the outlet port 32 whereby whatever the pressure value of the fluid is in the chamber 69 will also be the pressure value of the pressure fluid that is utilized to rebalance the secondary lever 11 and will provide the pressure value of the output pneumatic signal at the output port 34 for recording and/or indicating or other purposes as desired. Thus, the pressure value of the fluid in the chamber 69 will vary as the pressure differential across the diaphragm 13 of the primary device 12 varies in a manner hereinafter described.

A zero or compression spring 77 has one end 78, in effect, bearing against the balancing member 25 and the other end 79' bearing against a stem 79 of an adjustable member having an adjusting head 80 threaded in a threaded opening 81 of the housing 27 and accessible from the exterior thereof so that the force zeroing spring 77 can be adjusted in a manner hereinafter described.

From the above description of the relay module unit 10 of this invention, it can be seen that the same is self-contained in that it carries the pilot nozzle 23, the relay valve means 37 and the rebalancing member 25 as a unit 10 that can be readily attached to and detached from the primary device 12 by merely loosening and removing the threaded fastening members 22 at the bracket 21 so that a new unit 10 can be substituted therefor.

As previously stated, the self-contained relay modular unit 10 of this invention can be pretested at a location remote from the primary device 12 as will be apparent hereinafter and then can be utilized to replace a defective unit 10 in a simple and effective manner now to be described.

The defective unit 10 is removed from the bracket 21 of the primary device 12 and the new unit 10 is inserted downwardly into the bracket 12 until the inlet and outlet ports 28 and 32 thereof respectively telescope onto the nipples 29 and 33 of the stationary housing 26 so as to cause the unit 10 to float thereon as the unit 10 will have its threaded openings aligned with the openings in the bracket 21 to permit the threaded fastening member 22 to be fastened thereto before the unit 10 can seat against the housing 27 of the pressure device 12 so that the unit 10 is actually floating above the housing 26 as illustrated in the drawings. Because of the normal tolerances provided between the threaded fastening members 22 and the threaded openings receiving the same, the housing 26 when being assembled to be bracket 21 can be so positioned relative to the secondary lever 11 that the secondary lever 11 in its balanced condition will have the end 24 thereof so contact the plunger 55 of the valve member 52 of the pilot nozzle 23 that the free end thereof is disposed flush with the closed end 51 of the nozzle cup 48 so that a maximum opening of the valve seat 54 is provided.

Since during the initial assembly of the relay unit 10 of this invention to the bracket 21 of the primary device 12 is taking place without any supply pressure being interconnected to the supply port 28 thereof, the normal bias of the rebalanced bellows 71 has the member 25 disposed in the dotted line position as illustrated in the drawing so that the vertical insertion of the unit 10 into position in the bracket 21 permits the conical end 73 of the rebalance member 25 to clear past the socket cup 75 on the secondary lever 11. However, when the supply pressure is interconnected to the port 28 to the housing 26, such supply pressure is so initially bled to the atmosphere by the fully opened valve seat 54 of the pilot nozzle 23 that the same cannot create a sufficient force in the chamber 45 acting on the right side of the diaphragm 60A carried by the diaphragm or bellows cap 60 to overcome the force of the spring 66 as well as the natural spring force of the relay bellows 58 to open the valve member 65 away from the valve seat 56 so that no fluid pressure can enter the relay bellows 58 nor the chamber 69 that leads to the outlet 34. However, the assembler of the unit 10 to the primary device 12 then adjusts the nozzle cap 49 in such a manner that the same is threaded into the threaded opening 47 an amount to attempt to cause an increase in the bleed restriction at the valve seat 54 to tend to create a predetermined minimum pressure in the chamber 69 which will seat the conical end 73 of the balance member 25 fully within the socket 74 of the socket member 75 of the secondary lever 11 when the secondary lever 11 is in its balanced condition as illustrated in the drawings.

For example, it has been found that when the supply pressure for the supply port 28 of the relay module 10 is approximately 20 psi and when the pressure differential in the primary device 12 is at its minimum point in the range thereof, the output pressure at the output port 34 can be approximately 3 psi so that the entire range of the pressure differential of the primary device 12 will be balanced by the signal pressure at the outlet port 34 of the unit 10 being between 3 psi and 15 psi, such correlation between the pressure range of the primary device 12 and the pressure range of the relay module unit 10 being provided by the adjustment of the fulcrum 15 in a manner conventional in the art.

Since the adjustment of the cap 49 of the pilot nozzle 23 is a coarse adjustment attempting to produce a 3 psi signal at the outlet port 34 when the secondary lever 11 is in its balanced condition and the minimum pressure differential is existing across the diaphragm 13, after the cap 49 has been adjusted to approximate such 3 psi pressure at the outlet port 34, the assembler then utilizes the adjusting member 80 for the zero spring 77 as a fine adjustment so that the signal being produced at the outlet 34 will be just 3 psi when the balance member 25 is fully seated within the socket 74 of the socket cup 75 in opposition to the natural force of the bellows 71 to move the member 25 to the left out of the socket 74 and the secondary lever 11 is in its fully balanced condition.

At this time, the relay module 10 has now been properly assembled to the primary device 12 and will now function in the following manner.

Should the pressure on the high side 19 of the primary device 12 increase over the pressure on the low pressure side of the diaphragm 13 of the primary device 12 to increase the pressure differential across the diaphragm 13 an amount sufficient to cause the primary lever 17 to move to the right in the drawings, the lever 17 will cause corresponding clockwise pivotal movement of the secondary lever 11 about the fulcrum 15 so that the end 24 of the secondary lever 11 moves slightly to the right and causes the plunger 55 and its valve member 52 to also move to the right and thereby decrease the amount of bleed of the pressure fluid downstream from the orifice or restriction cup 41 to the atmosphere so that the fluid pressure being delivered to the loading chamber 45 of the diaphragm 60A builds up and causes the diaphragm 60A to move to the left and, thus, increase the amount of opening of the valve seat 56 so that an increased amount of pressure fluid is delivered into the chamber 57 and, thus, to the chamber 69 to act on the end 72 of the balance bellows 76 and force the rebalance member 25 to the right with a greater force to tend to pivot the lever 11 in a counterclockwise direction so that when the force of the pressure fluid in the chamber 69 has increased an amount to return the lever 11 to a true balanced or vertical condition thereof as illustrated in the drawings such increase in pressure in the chamber 69 is maintained and the new value of the pressure fluid being directed out of the signal outlet 34 indicates that a new pressure differential condition is existing in the primary 12. Conversely, a decrease in the pressure differential across the diaphragm 13 of the primary 12 causes a counterclockwise pivoting of the secondary lever 11 and, thus, a greater opening of the valve seat 54 of the pilot nozzle 23 to thereby cause a decrease in the pressure of the fluid in the loading chamber 45 of the diaphragm 60A so that the valve member 65 moves closer to the valve seat 56 to decrease the amount of pressure in the chamber 57 and, thus, the pressure in the chamber 69 so that the rebalance member 75 moves to the left to cause clockwise movement of the lever 11 so that the lever 11 will return to its fully balanced or vertical condition with such reduced pressure in the chamber 69 now being directed as a signal out of the outlet 34 to indicate the change in the pressure differential of the primary device 12.

Thus, the relay module unit 10 of this invention functions in the normal manner for causing a rebalancing of a secondary lever of a primary device 12, such as a pressure differential transmitter or pressure differential cell, but has the unique feature of permitting the rebalance arrangement to be simply replaced as a self-contained unit 10 in the field with the replaceable unit 10 being adapted to be pretested at a location remote from the primary device 12 and be readily inserted in place to operate in the manner previously described to thereby completely reduce the normal shutdown time required by prior known devices that must be repaired in the field or cause the entire primary device 12 to be replaced by another primary device 12 during such repair.

In particular, it can be seen that in the assembly plant for the relay module units 10, a standard primary device 12 can be utilized for testing purposes so that each individual unit 10 can be assembled adjacent the secondary lever 11 of the primary testing device 12 and be aligned therewith in the manner previously described for the replacement of a unit 10. Thereafter, the unit 10 can be run through its paces by the operation of the standard primary 12 through the range of differential pressures to make sure that the particular module 10 being tested operates properly throughout the entire range of operation thereof. Thus, once a unit 10 has been tested in this manner with the standard primary device 12, then the same can be subsequently utilized in the field with any primary device 12 to be assembled thereto in the manner previously described without requiring full testing in the field of the entire range of operation of the unit 10 as the same has been tested out at the time unit 10 was manufactured.

Thus, the repair man in the field merely removes a defective unit 10 and replaces the same with the new unit 10 in the manner previously described through the threaded fastening members 22 and then merely adjusts the nozzle cup 49 and the zero spring 67 by the adjusting member 80 thereof whereby the unit 10 is now adapted to completely function with the primary device 12 when the primary device 12 is subsequently operated so that the down time thereof is relatively small. If desired, the defective unit 10 can be sent back to a central repair place to be repaired by experts for just that purpose.

Accordingly, it can be seen that this invention not only provides a self-contained relay module unit which can be readily assembled to and disassembled from a primary device in a simple and effective manner, but also this invention provides an improved system utilizing such a unit.

While the form of the invention now preferred has been described as required by the patent statutes, other forms may be utilized, all coming within the scope of the appended claims.

What is claimed is:

1. In combination, a device having a pivotally mounted lever that pivots in response to changes in the operation of said device, a self-contained relay module unit for attachment to said device and being removable therefrom as a unit, said unit having a housing provided with a pilot nozzle that senses pivotal movement of said lever, said housing having a force balancing member that engages said lever and pivots the same in a direction opposite to the pivot movement thereof by said changes in the operation of said device so as to place said lever in a balanced condition thereof, said housing having relay valve means for causing such movement of said force balancing member in relation to the lever condition being sensed by said pilot nozzle, said device having a pressure supply passage means and a pressure signal passage means, said housing having a pressure supply passage means and a pressure signal passage means, and interconnecting means respectively interconnecting said passage means of said housing to said passage means of said device, said interconnecting means floatingly interconnecting to said passage means of said device.

2. A combination as set forth in claim 1 wherein said unit is adapted to be pretested remote from said device before being attached thereto.

3. A combination as set forth in claim 1 wherein said unit is attached to said device by threaded fastening means.

4. A combination as set forth in claim 1 wherein said pilot nozzle and said force balancing member are adjustable relative to said housing before and after attachment to said device.

5. A combination as set forth in claim 4 wherein said pilot nozzle and said force balancing member project from said housing in the same direction and contact the same side of said lever of said device.

6. A combination as set forth in claim 1 wherein said housing has internal passage means therein fluidly interconnecting said pilot nozzle, said relay valve means and said force balancing member together.

7. In combination, a device having a pivotally mounted lever that that pivots in response to changes in the operation of said device, a self-contained relay module unit for attachment to said device and being removable therefrom as a unit, said unit having a housing provided with a pilot nozzle that senses pivotal movement of said lever, said housing having a force balancing member that engages said lever and pivots the same in a direction opposite to the pivot movement thereof by said changes in the operation of said device so as to place said lever in a balanced condition thereof, said housing having relay valve means for causing such movement of said force balancing member in relation to the lever condition being sensed by said pilot nozzle, said housing having a supply pressure port and a signal output port respectively and floatingly interconnected to a supply pressure nozzle and a signal output nozzle of said device.

8. In a pneumatic system having a device provided with a lever that pivots in response to pressure differential changes in said device, the improvement comprising a self-contained relay module unit attached to said device and being removable therefrom as a unit, said unit having a housing provided with a pilot nozzle that senses pivotal movement of said lever, said housing having a force balancing member that engages said lever and pivots the same in a direction opposite to the pivotal movement thereof caused by said changes in the pressure differential of said device so as to place said lever in a balanced condition thereof, said housing having relay valve means for causing such movement of said force balancing member in relation to the lever condition being sensed by said pilot nozzle, said device having a pressure passage means and a pressure signal passage means, said housing having a pressure passage means and a pressure signal passage means, and interconnecting means respectively interconnecting said passage means of said housing to said passage means of said device, said interconnecting means floatingly interconnecting to said passage means of said device.

9. In a pneumatic system as set forth in claim 8, the further improvement wherein said unit is attached to said device by threaded fastening means.

10. In a pneumatic system as set forth in claim 8, the further improvement wherein said pilot nozzle and said force balancing member are adjustable relative to said housing before and after attachment to said device.

11. In a pneumatic system as set forth in claim 10, the further improvement wherein said pilot nozzle and said force balancing member project from said housing in the same direction and contact the same side of said lever of said device.

12. In a pneumatic system as set forth in claim 8, the further improvement wherein said housing has internal passage means therein fluidly interconnecting said pilot nozzle, said relay valve means and said force balancing member together.

13. In a pneumatic system having a device provided with a lever that pivots in response to pressure differential changes in said device, the improvement comprising a self-contained relay module unit attached to said device and being removable therefrom as a unit, said unit having a housing provided with a pilot nozzle that senses pivotal movement of said lever, said housing having a force balancing member that engages said lever and pivots the same in a direction opposite to the pivot movement thereof by said changes in the pressure differential of said device so as to place said lever in a balanced condition thereof, said housing having relay valve means for causing such movement of said force balancing member in relation to the lever condition being sensed by said pilot nozzle, said housing having a supply pressure port and a signal output port respectively and floatingly interconnected to a supply pressure nozzle and a signal output nozzle of said device.

* * * * *